(12) United States Patent
Haverkos et al.

(10) Patent No.: US 6,265,005 B1
(45) Date of Patent: *Jul. 24, 2001

(54) COATING COMPOSITION FOR FOODS AND METHOD OF IMPROVING TEXTURE OF COOKED FOODS

(75) Inventors: Stephen M. Haverkos; Denise A. Triunfol, both of Chicago, IL (US)

(73) Assignee: Newly Weds Foods, Inc., Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,788

(22) Filed: Apr. 24, 1998

(51) Int. Cl.⁷ .................................................. A23B 4/10
(52) U.S. Cl. ........................... 426/302; 426/89; 426/94; 426/293; 426/296; 426/549
(58) Field of Search ..................... 426/94, 289, 293, 426/296, 302, 89, 549

(56) References Cited

U.S. PATENT DOCUMENTS

| 3,794,742 |   | 2/1974  | Harris et al. . |         |
|-----------|---|---------|-----------------|---------|
| 3,956,515 | * | 5/1976  | Moore et al.    | 426/302 |
| 4,260,637 | * | 4/1981  | Rispoli et al.  | 426/293 |
| 4,285,978 |   | 8/1981  | Quinlivan .     |         |
| 4,375,484 |   | 3/1983  | Lee et al. .    |         |
| 4,487,786 |   | 12/1984 | Junge .         |         |
| 4,504,509 |   | 3/1985  | Bell et al. .   |         |
| 4,753,790 |   | 6/1988  | Silva et al. .  |         |
| 4,762,721 |   | 8/1988  | Holscher et al. . |       |
| 5,120,562 |   | 6/1992  | Furcsik et al. . |        |
| 5,232,721 |   | 8/1993  | Polansky .      |         |
| 5,242,699 |   | 9/1993  | Bednar et al. . |         |
| 5,266,339 |   | 11/1993 | Samson et al. . |         |
| 5,372,829 |   | 12/1994 | Chalupa et al. . |        |
| 5,424,088 |   | 6/1995  | Christianson et al. . |   |
| 5,431,951 |   | 7/1995  | Bamford et al. . |        |
| 5,849,351 | * | 12/1998 | Higgins et al.  | 426/305 |

* cited by examiner

Primary Examiner—Lien Tran
(74) Attorney, Agent, or Firm—Brinks Hofer Gilson & Lione; G. Peter Nichols

(57) ABSTRACT

A coating composition for foods includes starch and an effective amount of gum acacia to provide enhanced crunchiness and heat retention. A method of making crunchy food includes coating an edible food with the coating composition.

23 Claims, No Drawings

COATING COMPOSITION FOR FOODS AND METHOD OF IMPROVING TEXTURE OF COOKED FOODS

BACKGROUND OF THE INVENTION

This invention relates to a coating for food products, particularly fried food products. The coating of the present invention provides enhanced crispness and heat retention as well as uniformity in cooked color.

Batter and bread coated fried foods have a broad appeal. For example, popular batter and bread fried foods include fried chicken, fish and other meat products as well as a variety of other foods such as vegetables (potatoes) and even fruits. Batters typically consist primarily of farinaceous materials such as starches and flours. The batters are generally hydrated with water so that they can be applied to the food product such as by dipping, spraying or other known techniques. Breadings typically consists of wheat flour, corn meal, cracker crumbs, bread crumbs and the like. Breadings are generally applied after some form of batter coating.

In practice, the food product to be fried is coated with a batter or breading or both, and then par-fried or raw breaded or frozen. The product can then be finished cooked such as by deep frying.

One drawback of deep fried food is that it is cooked before there is a need to consume it, and consequently it becomes less crisp, loses moisture, and cools rapidly. One method of reducing the loss of crispness and heat is to place the food under a heat lamp. This method of holding deep fried food, however, does not maintain the food quality long enough for hold times now required by quick service restaurants and home meal replacement establishments. Thus, there is a continuing need for a coating that provides crispness, heat and moisture retention while maintaining the desired quality attributes.

The coating of the present invention addresses these concerns by providing a coating that contains an effective amount of gum acacia to produce a final food product having enhanced heat retention, crispiness, and moisture retention as compared to coatings that do not contain gum acacia.

Although it is known to add gum acacia to protect the flavor of batters, breadings, dry flavor mixes and seasonings, the gum acacia is added in minor amounts, from 1% to 5%, and in combination with other gums. Surprisingly, it has been found that combining starch with an amount of gum acacia greater than 5% provides a unique coating. This finding forms the basis of the coating of the present invention.

SUMMARY OF THE INVENTION

The present invention relates to a coating for foods that includes a starch and an amount of gum acacia greater than 5%. The coating is typically formulated as dry mix that can later be hydrated by adding an aqueous medium to form a liquid batter.

Accordingly, the present invention contemplates a fried-food coating composition wherein the improvement comprises incorporating at least about 5% of gum acacia in the composition.

The present invention also contemplates a food product comprising an edible foodstuff and a coating surrounding the foodstuff that includes a starch and at least 5% of gum acacia.

The present invention also includes a process for preparing a crunchy foodstuff that comprises applying a coating composition to an edible foodstuff, wherein the composition comprises a starch and at least 5% of gum acacia and par-frying the coated foodstuff. Alternatively, the process includes applying a coating composition to an edible foodstuff and then freezing. Thereafter, the frozen product may be cooked (e.g., fried) whenever convenient.

Unless noted otherwise, all percentages recited in the specification and accompanying claims refer to a weight percentage.

DETAILED DESCRIPTION OF THE INVENTION

The coating of the present invention comprises two essential ingredients: starch and gum acacia.

The starch material can be derived from a variety of sources including, but not limited to, cereal, tuber, and vegetable starches such as pea starches. The starch may be modified and/or unmodified and those of skill in the art will understand how to select from one or more of the starches that may be used in the present invention. For example, the starch may include but is not limited to tapioca (modified and unmodified) corn (high amylose and otherwise), waxy maize, sweet potato, potato, canna, arrowroot, sorghum, waxy sorghum, waxy rice, sago, rice, etc., as well as mixtures thereof. Preferably, the starch is a mixture of a modified and unmodified starch, for example, an unmodified corn starch and a modified food starch.

The starch is present in the coating composition in an amount from about 5% to about 95%, preferably from about 10% to about 60%, more preferably from about 15% to about 55%. In one embodiment, the starch is present at a level of about 30% to about 55%, more preferably about 42.9% wherein about 29.7% is corn starch and about 13.2% is modified food starch.

In another embodiment of the present invention, the starch is added in lower amounts, typically from about 10% to about 45%, preferably from about 15% to about 35%, more preferably about 22.7% wherein about 17% is corn starch and about 5.7% is a modified food starch. In this embodiment, some of the starch is replaced with a maltodextrin, a maltose-free dextrin, or a combination of both.

Gum acacia also known as gum arabic is a salt of a complex polysaccharide that is derived from the stems and/or branches of *Acacia senegal* or related species of Acacia. It is commercially available as a powder and is odorless and tasteless.

The gum acacia provides the enhanced crunch and clean appearance of the coating of the present invention. The gum acacia can be incorporated in the coating of the present invention in an amount greater than 5% to about 95%, preferably from about 6% to about 50%, more preferably from about 12% to about 35%. In one embodiment of the present invention, the gum acacia is present at a level of about 15% to about 25%, preferably about 19.8%.

In this one embodiment of the present invention, the gum acacia is added in lower amounts, typically from about 6% to about 15%, preferably about 8.5%. In this embodiment, some of the gum acacia is replaced with a maltodextrin, a maltose-free dextrin, or a combination of both.

In this one embodiment of the present invention, the coating contains a maltodextrin. The maltodextrin is preferably a low DE type, typically less than 20 and is preferably a 10 DE maltodextrin that is available from Roquette. It is believed that the combination of the gum acacia and maltodextrin produce a coating that can be caramelized in an amount of time shorter than a coating that does not contain the combination. For example, a coating that contains the maltodextrin and gum acacia can be caramelized after only about 3 minutes of deep fat frying.

The maltodextrin can be added to the coating in an amount from about 1% to about 50%, preferably from about 10% to about 40%, particularly from about 20% to about 30%, and most preferably about 24%.

In another embodiment, a maltose-free dextrin can be added to the coating, which may or may not contain a maltodextrin. The maltose-free starch dextrin can be selected from the group consisting of corn starch dextrin, potato starch dextrin and tapioca dextrin. The maltose-free dextrin ingredient promotes the desirable crispiness and in the final cooked product without greatly increasing the caramelization or excessive browning during cooking. It is believed that it enhances the shell-like texture of the final cooked product to lock-in the moisture, flavor and heat of the food substrate and thus, extends the heat lamp holding time. Because the corn starch and potato starch dextrins tend to impart an off-taste to the final product, the maltose-free starch dextrin is preferably a tapioca dextrin. The tapioca dextrin may be pre-gelatinized. A preferred tapioca dextrin is that sold by National Starch.

The maltose-free dextrin can be present in the coating in an amount from about 0.5% to about 30%, preferably from about 1% to about 15%, more preferably from about 5% to about 12%, particularly from about 7% to about 10%, and most preferably about 4% to about 8%, particularly about 5.7%.

The coating may also include a fat and an emulsifier. The fat may be derived from vegetable or animal sources. It is preferred, however, to use those from vegetable sources such as soybean oil, corn oil, safflower oil, cottonseed oil, sunflower oil, palm oil, coconut oil, peanut oil, and the like. These oils may be in their pure liquid form or may be partially or totally hydrogenated.

The fat generally is included in an amount from about 0.1% to about 5%, preferably from about 0.5% to about 2%, and most preferably about 1.1% to about 1.3%.

The emulsifier can be any edible material that is known to emulsify the particular fat used and that can assist in maintaining the batter suspension. In addition, the emulsifier promotes formation of the desired crispy features of the present invention. Suitable emulsifiers include the mono and diglycerides and lecithin.

The emulsifier generally is included in an amount from about 0.1% to about 5%, preferably from about 0.5% to about 2%, and most preferably about 1.1% to about 1.3%.

The coatings of the present invention may also include a sugar alcohol such as sorbitol, which accelerates color development and reduces the finished opaque appearance of the finished coating. The sugar alcohol may be included in an amount from about 0.1% to about 5%, preferably from about 0.5% to about 2%, and most preferably about 1.1% to about 1.3%.

Other known conventional batter additives may be added so long as they do not detract from the advantageous properties of the coating of the present invention. For example, additives such as seasoning, leavening (consisting of leavening base and acids), spices, flavoring and coloring agents, salt, cream of tartar, foaming agents, egg yolks, sweeteners, preservatives, antioxidants, thickening agents (e.g., mucilaginous and/or proteinaceous materials such as milk and non-fat milk solids, casseinates, wheat gluten, egg albumin, carboxymethylcellulose, hydroxypropyl methyl cellulose and other modified edible celluloses, alginates) may be incorporated in the dry or liquid coatings of this invention.

Typically, salt will be added to enhance the flavor of the finished coating. The salt is added in an amount from about 0.1% to about 5%, preferably from about 0.5% to about 2%, and more preferably from about 1.1% to about 1.3%.

To use the coating, the dry coating ingredients are hydrated in an aqueous medium to form a liquid batter. Any aqueous medium that will hydrate the dry coating ingredients may be used for this purpose. For example, water or any other suitable water-containing food product, e.g., milk, eggs, etc., may be used. Preferably, water is used.

The resulting batter compositions typically include from about 10% to about 60%, preferably from about 20% to about 50%, more preferably from about 25% to about 45% aqueous medium, most preferably from about 30% to about 35% (in one embodiment about 30.8% and in another about 33.6%), preferably water.

The viscosity of the liquid batter can be adjusted to an appropriate level depending on the particular end use by the amount of aqueous medium and/or viscosity modifiers. Suitable viscosity modifiers include but are not limited to hydroxypropyl methylcellulose, carboxymethylcellulose, other modified celluloses, alginates, xanthan gum, pectin, gellan gum, carrageenan and mixtures thereof. Preferably, the viscosity modifier is selected from the group consisting of hydroxypropyl methylcellulose, carboxymethylcellulose, alginates, xanthan gum, and mixtures thereof. More preferably, the viscosity modifier is a carboxymethylcellulose. The viscosity modifier is added in an amount from about 0.1% to about 5%, preferably from about 0.5% to about 2%, and more preferably about 1.1% to about 1.3%.

Generally, the viscosity is such that the batter pick-up is between about 5% and about 30%, depending on consumer desired preferences and other factors. The batter pickup is measured by the following formula:

$$\% \text{ Coated Final Product Pickup} = \frac{(\text{Coated Foodstuff Product Weight} - \text{Uncoated Foodstuff Product Weight})}{\text{Coated Foodstuff Product Weight}} \times 100$$

Preferably, the pick-up is between about 8% about 20%, more preferably between about 10% and about 15%, most preferably between about 10% about 12%.

The batter of the present invention can be used to coat a wide variety of food products. Food pieces that are adapted to be fried in the presence of cooking oils or fats (e.g., oven, skillet, and deep fat fried food pieces) can be suitably coated with the coatings of the present invention. Typical food pieces include fresh and frozen meats such as veal, pork, and beef, synthetic meat products, (meat analogues) fish, including fish sticks, fish steaks, fish fillets, formed fish, whole fish, scallops, oysters, shell fish, clams, shrimps, lobster and synthetic fish products, for example (surimi) poultry including boned and de-boned, formed and extruded, vegetables including potatoes (whole, pieces, or otherwise), zucchini, squash, onions, peppers, brassica-type such as broccoli and cauliflower as well as others, mushrooms, etc., and vegetable analogues (textured vegetable protein) as well as fruits.

Accordingly, the present invention contemplates a method of improving the texture of foods that comprises applying the composition of the present invention to an edible foodstuff. In one embodiment, the present method comprises: breading a foodstuff, applying the coating according to the present invention to the breaded foodstuff, and par-frying the coated product. The par-fried product may then be frozen, or fully cooked (by an oven, by frying, or by any other known means) and then frozen, or fully cooked and then served.

In another embodiment, the present method comprises: applying the coating according to the present invention to a foodstuff and par-frying the coated product. The par-fried product may then be frozen or fully cooked (by an oven, by frying, or by any other known means) and then frozen, or fully cooked and then served.

Alternatively, another method includes applying the coating of the present invention to a foodstuff and then freezing the coated foodstuff. Thereafter, the frozen coated foodstuff may be partially or wholly cooked as desired according to any known method.

EXAMPLES

The following examples illustrate, but do not limit, the present invention. Unless otherwise indicated, all parts and percentages are by weight.

Example 1

The following example provides suitable ranges of ingredients for one embodiment of the present invention. In this embodiment, the presence of the maltodextrin allows the fry time (par fry, finish fry, or both) to be reduced as compared to a coating that does not contain the maltodextrin.

| Ingredient | Amount (wt %) |
| --- | --- |
| Water | 30–40 |
| Maltodextrin (10 DE) | 20–30 |
| Cornstarch | 15–20 |
| Gum Acacia | 7–10 |
| Tapioca Dextrin | 4–8 |
| Modified Food Starch | 4–8 |
| Salt | 0.5–2 |
| Soybean oil | 0.5–2 |
| Carboxymethylcellulose | 0.5–2 |
| Emulsifier | 0.5–2 |
| Sorbitol | 0.5–2 |
| Total | 100 |

Example 2

The following example provides suitable ranges of ingredients for another embodiment of the present invention.

| Ingredient | Amount (wt %) |
| --- | --- |
| Water | 25–35 |
| Cornstarch | 25–35 |
| Gum Acacia | 15–25 |
| Modified Food Starch | 11–16 |
| Salt | 0.5–2 |
| Soybean oil | 0.5–2 |
| Carboxymethylcellulose | 0.5–2 |
| Emulsifier | 0.5–2 |
| Sorbitol | 0.5–2 |
| Total | 100 |

It will also be apparent that various modifications and changes can be made both in the processing and in the relative amounts of the preferred ingredients to prepare food products without departing form the scope of the invention set forth in the claims. All such modifications or changes coming within the terms of the claims are intended to be included in the claims.

What is claimed is:

1. A food coating composition comprising from about 5% to about 95% by weight starch and from about 12% to about 95% by weight gum acacia.

2. The composition of claim 1 further comprising a maltodextrin.

3. The composition of claim 2 wherein the maltodextrin is present in an amount from about 1% to about 50%.

4. The composition of claim 1 further comprising a maltose-free dextrin.

5. The composition of claim 4 wherein the maltose-free dextrin is present in an amount from about 0.5% to about 30%.

6. The composition of claim 1 further comprising an oil and an emulsifier.

7. The composition of claim 6 wherein the oil is present in an amount from about 0.1% to about 5% and the emulsifier is present in an amount from about 0.1% to about 5%.

8. The composition of claim 1 further comprising a viscosity modifier.

9. The composition of claim 8 wherein the viscosity modifier is present in an amount from about 0.1% to about 5%.

10. The composition of claim 1 further comprising water.

11. In a fried food coating composition including starch, the improvement comprising, from about 5% to about 95% by weight of the starch and from about 12% to about 95% by weight of gum acacia.

12. A food product comprising:
   a. an edible foodstuff;
   b. a coating surrounding the foodstuff; said coating comprising from about 5% to about 95% by weight starch and from about 12% to about 95% by weight gum acacia.

13. A process for preparing a crunchy foodstuff comprising applying a coating composition to an edible foodstuff, wherein the composition comprises from about 5% to about 95% by weight starch and from about 12% to about 95% by weight gum acacia.

14. The process of claim 13 wherein the coated foodstuff is par-fried.

15. The process of claim 14 wherein the edible foodstuff is breaded prior to applying the coating composition.

16. The process of claim 14 wherein the par-fried foodstuff is frozen.

17. The process of claim 16 wherein the par-fried foodstuff is fully cooked prior to being frozen.

18. The process of claim 13 wherein the coated foodstuff is frozen.

19. The composition of claim 1 wherein the gum acacia is present in an amount from about 12% to about 35% by weight.

20. The composition of claim 1 wherein the gum acacia is present in an amount from about 15% to about 25% by weight.

21. The composition of claim 1 wherein the composition has a viscosity to provide a pick-up between about 5% and about 30%.

22. In a fried food coating composition that includes a maltodextrin and a maltose-free dextrin, the improvement comprising from about 5% to about 95% by weight starch and from about 12% to about 95% by weight gum acacia.

23. The composition of claim 22 wherein the gum acacia is present in an amount from about 12% to about 35% by weight.

* * * * *